Oct. 20, 1959  J. M. WALLACE  2,909,729
INSTRUMENT FRAME STRUCTURE
Filed June 23, 1955  2 Sheets-Sheet 1

WITNESSES
Robert C. Baird
David M. Schiller

INVENTOR
James M. Wallace.
BY C. L. Freedman
ATTORNEY

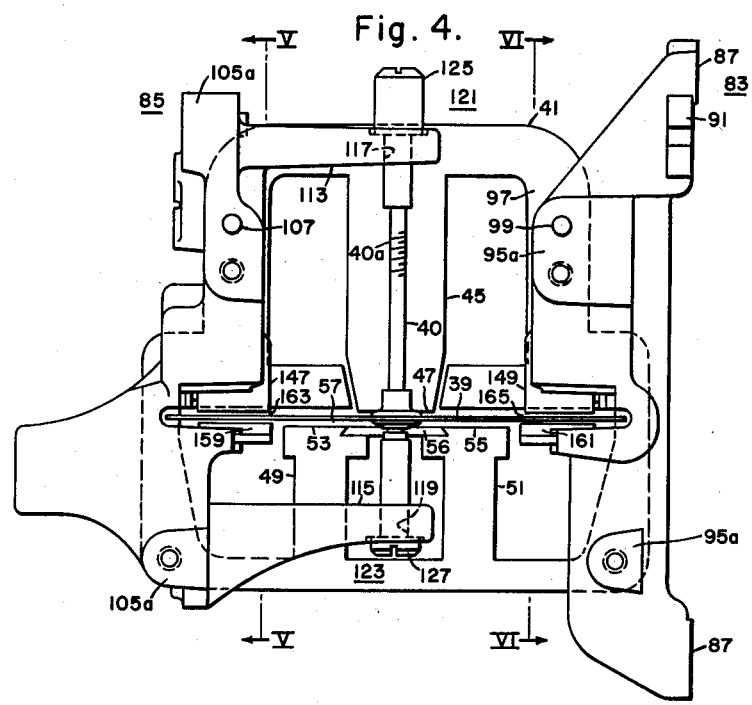
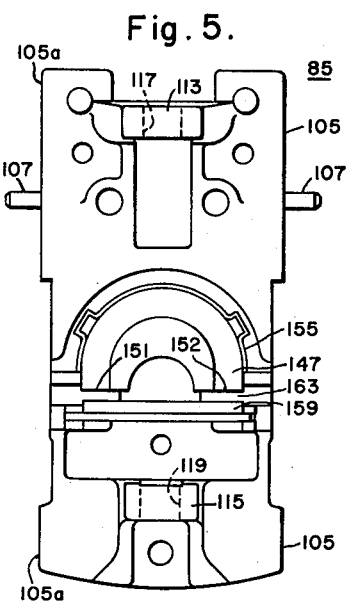
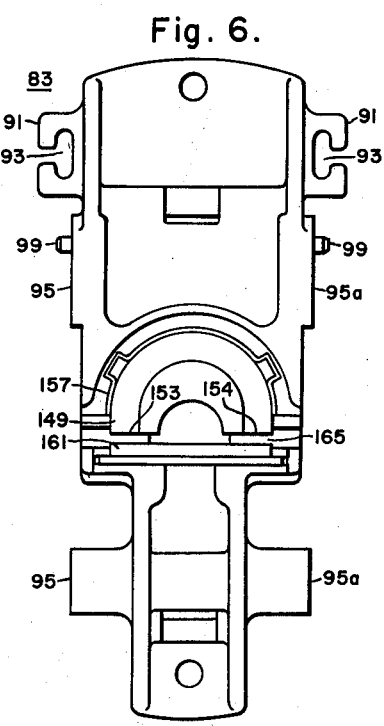

United States Patent Office 2,909,729
Patented Oct. 20, 1959

2,909,729
INSTRUMENT FRAME STRUCTURE

James M. Wallace, Montclair, N.J., assignor to Westinghouse Electric Corporation, East Pittsburgh, Pa., a corporation of Pennsylvania Application June 23, 1955, Serial No. 517,513

2 Claims. (Cl. 324—137)

This invention relates to instrument frame structures and has particular relation to a frame structure for supporting the operating parts of an induction watt-hour meter.

The teachings of the invention may be employed in connection with various types of instruments such as electrical relays and meters. The invention will be described, however, in connection with multielement watt-hour meters of the induction type which are employed to measure energy of polyphase circuits.

In accordance with the invention, a watt-hour meter is provided including stator and rotor structures with a frame structure of two-part formation arranged so that each of the frame parts supports a separate one of the stator and rotor structures. The stator structure includes a pair of electromagnetic elements with one of the frame parts secured to a suitable supporting base to mount the electromagnetic elements in spaced relation. The other frame part is preferably secured to the electromagnetic elements in spaced relation with respect to the one frame part to maintain proper spacing of the elements for providing a rigid structure. The other frame part also is employed to support the rotor structure for rotation relative to the stator structure.

Watt-hour meters generally include a register assembly for providing an indication of the energy consumed in an associated circuit. The register assembly is coupled to the rotor structure by suitable coupling gearing for actuation in accordance with rotation of the rotor structure. The invention further provides a watt-hour meter including a register assembly and coupling gearing which are supported by the same frame part which supports the rotor structure.

According to a preferred embodiment of the invention, a multielement watt-hour meter is provided which includes a pair of electromagnetic elements positioned to influence a common electroconductive armature. The meter further includes a frame structure of two-part formation with one part secured to the electromagnetic elements to extend between the electromagnetic elements to mount the elements in a pair of spaced parallel planes.

The other frame part is secured to the electromagnetic elements in the space therebetween at points spaced from the points at which the one frame part is secured to the elements. With this arrangement, the other frame part maintains the spacing between the electromagnetic elements to provide a rigid structure. The other frame part is proportioned and positioned to mount the armature for rotation about an axis relative to the elements. A suitable register assembly is carried by the other frame part for actuation from the armature through coupling gearing which is also supported by the other frame part.

The invention further provides a watt-hour meter including a pair of frame parts proportioned to mount one or more permanent magnets for damping rotation of the armature. Preferably, each of the frame parts is proportioned to mount a separate magnet to position the magnets in a pair of spaced parallel planes which extend transverse to the planes of the electromagnetic elements. The magnets are positioned with respect to the frame parts and the electromagnetic elements so as to be effectively shielded against external magnetic fields. For this purpose the frame parts are formed of an electroconductive, non-magnetic material.

It is, therefore, an object of the invention to provide a watt-hour meter with improved means for supporting certain operating parts of the meter.

It is another object of the invention to provide a watt-hour meter including stator and rotor structures and a frame structure of two-part formation with each frame part supporting a separate one of the stator and rotor structures.

It is a further object of the invention to provide a watt-hour meter as defined in the preceding paragraph wherein one of the frame parts supports the stator structure and the other of the frame parts is secured to the stator structure to mount the rotor structure for rotation relative to the stator structure.

It is still another object of the invention to provide a multielement watt-hour meter including a pair of electromagnetic elements and a supporting frame structure of two-part formation with one part secured to the elements to mount the elements in spaced relation and with the other part secured to the elements at points spaced from the points at which the one part is secured to the elements to maintain the spacing of the elements for providing a rigid structure.

It is still another object of the invention to provide a watt-hour meter including a frame structure of two-part formation with each frame part proportioned to mount a separate permanent magnet for damping rotation of an associated rotor structure.

It is another object of the invention to provide a watt-hour meter as defined in the preceding paragraph wherein the magnets are effectively shielded against external magnetic fields.

It is a further object of the invention to provide a watt-hour meter including stator and rotor structures and a register assembly coupled to the rotor structure with a frame structure of two-part formation having one part supporting the stator structure and the other part supporting the rotor structure, the register assembly and the coupling means.

Other objects of the invention will be apparent from the following description taken in conjunction with the accompanying drawings, in which:

Fig. 4 is a view in side elevation with parts removed of the instrument of Fig. 1;

Fig. 5 is a view in rear elevation of a part of Fig. 4 taken along the line V—V of Fig. 4; and Fig. 6 is a view in front elevation of an additional part of Fig. 4 taken along the line VI—VI of Fig. 4.

Figure 1:
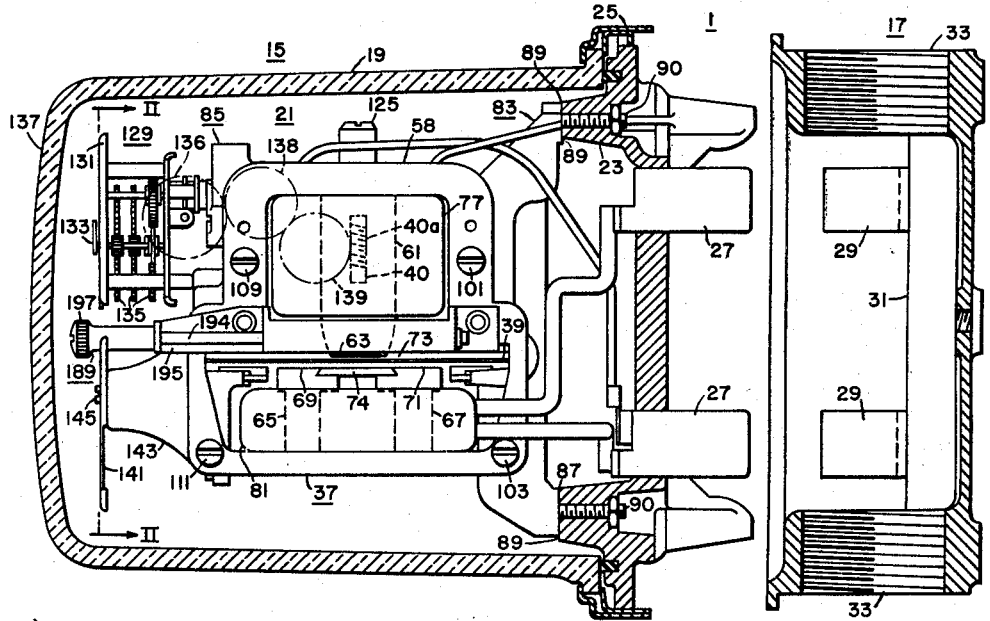
Figure 1 is a view in side elevation with parts shown in section of a detachable type instrument including cover and socket receptacles embodying the teachings of the invention.

Referring to the drawings, there is illustrated in Fig. 1 an instrument represented generally by the numeral 1 embodying the teachings of the invention. The instrument 1 is preferably in the form of a multielement watt-hour meter of the type effective for measuring energy of polyphase circuits. However, the teachings of the invention may be applied to other devices such as electrical relays.

As shown in Fig. 1, the meter 1 is of the detachable type including a cover receptacle 15 adapted for detachable engagement with a socket receptacle 17. The cover receptacle 15 includes a cover 19 preferably formed of a transparent material such as glass positioned to surround operating parts of the meter which are represented generally by the numeral 21. The cover 19 is secured to a suitable base member 23 which supports the operating parts 21. A suitable rim structure 25 is provided to secure the cover 19 to the base member 23. The base member 23 carries a plurality of contact blades 27 to which certain of the operating parts 21 are electrically connected.

The socket receptacle 17 is provided with a plurality of contact jaws 29 which are mounted on suitable insulating support 31 of the receptacle 17. The receptacle 17 is provided with a pair of opposed threaded openings 33 for receiving a threaded conduit (not shown) which houses source and load conductors of an associated circuit (not shown) which are electrically connected to the jaws 29. For the purpose of conditioning the meter 1 for energization, the cover receptacle 15 is positioned relative to the socket receptacle 17 with the contact blades 27 in engagement with the jaws 29. In Fig. 1 the cover receptacle 17 is shown in a detached condition relative to the receptacle 19.

Figure 2:
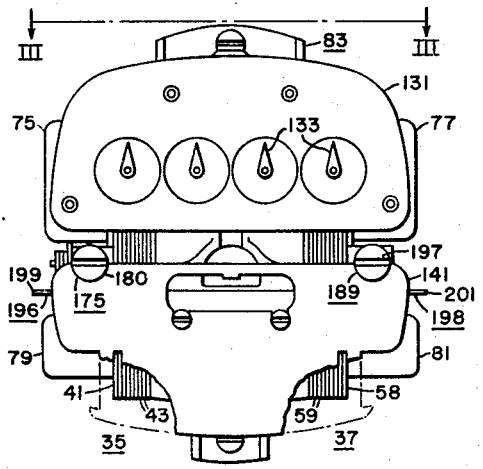
Fig. 2 is a view taken along the line II—II of Fig. 1.
Figure 3:
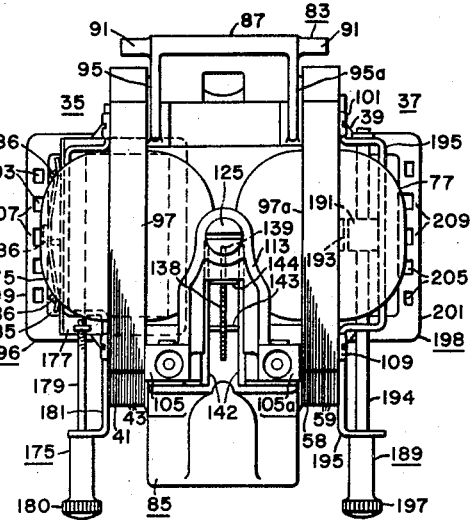
Fig. 3 is a view taken along the line III—III of Fig. 2.

As illustrated in Figs. 2 and 3, the meter 1 includes a stator structure comprising a pair of electromagnetic elements 35 and 37 arranged to influence a rotor structure which includes a common electroconductive armature in the form of a disc 39. The disc 39 is secured to a suitable shaft 40 having a threaded portion 40a which is mounted for rotation about an axis as hereinafter described. The details of construction of elements 35 and 37 are best shown in Figs. 1, 3 and 4.

As shown in Fig. 3, the electromagnetic element 35 includes a magnetic structure 41 preferably formed of a plurality of magnetic laminations 43. The laminations 43 are preferably formed of a low loss magnetic material such as a high silicon steel. Each of the laminations 43 has the configuration shown in Fig. 4. The structure 41 includes a voltage magnetic pole 45 having a pole face 47 and a pair of spaced current magnetic poles 49 and 51 having respectively pole faces 53 and 55. The pole faces 53 and 55 are positioned in a common plane which is spaced from and extends parallel to the plane of the pole face 47 to define an air gap 57. A suitable magnetic shunt 56 may be positioned between the current poles 49 and 51 to provide overload compensation as is understood in the art.

The element 37 includes a magnetic structure 58 as shown in Fig. 1 which may be of identical construction to the structure 41. The structure 58 is preferably formed of laminations 59 and includes a voltage pole 61 with a pole face 63 and a pair of spaced current poles 65 and 67 having respectively pole faces 69 and 71. The pole faces 69 and 71 are included in a common plane which is spaced from and extends parallel to the plane of the pole face 63 to define an air gap 73. A suitable magnetic shunt 74 may be positioned between the current poles 65 and 67 to provide overload compensation.

In order to permit energization of the elements 35 and 37, suitable voltage windings 75 and 77 are positioned to surround respectively the voltage poles 45 and 61. A pair of current windings 79, see Fig. 2, are positioned to surround the current poles 49 and 51 of the structure 41, and in a similar manner a pair of current windings 81 are positioned to surround the current poles 65 and 67 of the structure 58. The several windings may be connected for energization from a polyphase circuit (not shown) to effect rotation of the disc 39 in accordance with energy of the circuit (not shown).

In accordance with the present invention, the meter 1 includes a frame structure of two-part formation for mounting certain operating parts of the meter. One of the frame parts is secured to the magnetic structures 41 and 58 to mount the structures 41 and 58 in spaced relation, and the other frame is secured to the structures 41 and 58 to mount the rotor structure of the meter for rotation relative to the magnetic structures. Such other frame part is preferably secured to the structures 41 and 58 at points spaced from the points at which the one frame part is secured to the structures to maintain the spacing between the structures to provide a rigid structure. The details of construction of the frame structure are shown in Figs. 3 through 6, inclusive.

As illustrated, a frame part 83 is provided which is proportionated to mount the stator structure of the meter 1 in an operative position. The frame part 83 is preferably secured to the base member 23 for this purpose. In order to permit mounting of the frame part 83 to the base member 23, the part 83 includes a pair of spaced surfaces 87 adapted for engagement with cooperating surfaces 89 of the base member 23. The frame part 83 may be secured to the base member 23 in any suitable manner such as by suitable securing means in the form of threaded screw members 90. To permit proper positioning of the frame part 83 with respect to the base member 23, the part 83 is formed with suitable spaced extensions 91 which project from opposing side surfaces of the part 83. The extensions 91 include openings proportioned to receive suitable guide pins (not shown) which project from the base member 23.

In order to permit mounting of the electromagnetic elements 35 and 37 to the frame part 83, the part 83 is provided with opposing parallel side surfaces 95 and 95a adapted for engagement respectively with side surfaces 97 and 97a of the magnetic structures 41 and 58, respectively. As viewed in Fig. 6, suitable horizontally aligned guide pins 99 extend from the opposing surfaces 95 and 95a to engage suitable openings of the surfaces 97 and 97a of the structures 41 and 58. In order to secure the structures 41 and 58 to the frame part 83, suitable securing means illustrated in the form of threaded screw members 101 and 103 are provided to extend through a pair of vertically spaced sets of aligned openings of the structures 41 and 58 and the frame part 83, as viewed in Fig. 1.

With such an arrangement, the structures 41 and 58 are mounted by the frame part 83 in a pair of spaced parallel planes with the air gaps 57 and 73 in alignment in a plane extending transverse to the planes of the structures 41 and 58. It is further observed that the frame part 83 is positioned substantially within the space between the structures 41 and 58 at one end of the structures 41 and 58.

The frame part 83 may be constructed of any suitable material. Preferably, the part 83 is constructed of a non-magnetic electroconductive die casting material such as an aluminum die casting alloy which may be cast to provide a frame part 83 of the desired configuration. Such die casting material being electroconductive offers shielding against external electromagnetic fields. Inasmuch as the part 83 may be cast separately from other parts of the meter 1, a material may be employed which has a substantial melting temperature such as a temperature of the order of 500° C. or higher. The material of the part 83 may thus be selected to provide certain desired properties such as physical, electrical and chemical properties without fear that the temperatures required will interfere with other operations or components of the meter 1. The melting temperature of a suitable aluminum base die casting material is approximately 600° C.

A second frame part 85 is provided which is secured to the structures 41 and 58 in spaced relation with respect to the frame part 83 to carry the rotor structure of the meter 1 for rotation relative to the stator structure. The frame part 85 is proportioned and positioned to maintain spacing of the structures 41 and 58 to provide a rigid structure.

To this end, the frame part 85 includes opposing parallel side surfaces 105 and 105a adapted for engagement respectively with the side surfaces 97 and 97a of the structures 41 and 58. As viewed in Fig. 5, a pair of horizontally aligned guide pins 107 project from the opposing surfaces 105 and 105a of the part 85 to engage suitable openings of the surfaces 97 and 97a of the structures 41 and 58. In order to secure the frame part 85 to the structures 41 and 58, suitable securing means illustrated in the form of threaded screw members 109 and 111 are provided to extend through a pair of vertically spaced sets of aligned openings of the structures 41 and 58 and the frame part 85, as viewed in Fig. 1. The frame part 85 is preferably constructed of the same material employed in the formation of the frame part 83. The part 85 may be die-cast from such material in the same manner as the part 83 to provide a part 85 of the desired configuration.

It is observed that the frame part 85 is positioned substantially within the space between the structures 41 and 58 in spaced relation with respect to the frame part 83. As viewed in Figs. 1 and 3, the frame part 83 is secured to the base member 23 to mount the structures 41 and 58 in a pair of spaced parallel planes each including a line which extends parallel to the plane of the air gaps 57 and 73 between front and rear areas of the meter when the meter is in an operative position. It is observed that the frame part 83 is secured to the structures 41 and 58 at the rear area of the meter 1 and that the frame part 85 is secured to the structures 41 and 58 at the front area of the meter 1 at points which are spaced from the points at which the part 83 is secured to the structures. With such arrangement the part 85 is effective to maintain proper spacing of the structures 41 and 58 to thereby provide a very rigid support for the structures 41 and 58.

In order to permit mounting of the rotor structure of the meter 1 to the frame part 85, the part 85 is provided with a pair of spaced projections 113 and 115 which extend from a common surface of the part 85 substantially parallel to the side surfaces 105 and 105a. As viewed in Fig. 4, the projections 113 and 115 are spaced in a vertical direction and project from the rear of the frame part 85 toward the front of the frame part 83. The projections 113 and 115 have respectively openings 117 and 119 adjacent the free ends thereof with the openings in vertical alignment.

For the purpose of mounting the rotor structure to the frame part 85, suitable upper and lower bearing assemblies 121 and 123 are supported respectively by the projections 113 and 115 to provide a substantially frictionless support for the shaft 40. The bearing assemblies 121 and 123 include suitable screw members 125 and 127 which are in threaded engagement with the openings 117 and 119, respectively. Such arrangement permits ready installation and removal of the rotor structure with respect to the supporting frame part 85.

The frame part 85 is proportioned such that the projections 113 and 115 mount the disc 39 for rotation about a vertical axis relative to the structures 41 and 58 through the aligned air gaps 57 and 73. It is further observed that the frame part 85 supports the disc 39 symmetrically with respect to the magnetic structures 41 and 58.

In order to provide an indication of the number of revolutions of the disc 39 to determine the energy consumed in an associated circuit (not shown), a suitable register assembly 129 is provided. As illustrated in Figs. 1 and 2, the assembly 129 includes a suitable dial plate 131 over which a plurality of indicating pointers 133 are adapted to move. The pointers 133 are actuated by suitable gearing 135 which, in turn, is actuated from threaded portion 40a of the shaft 40 through intermediate coupling gears 136, 138 and 139.

As viewed in Fig. 1, the assembly 129 is supported by the frame part 85 at a front surface thereof with the dial plate 131 adjacent the portion 137 of the cover 19 to permit inspection of the plate 131. A suitable information bearing plate 141 is conveniently carried by the frame part 85 at the front surface thereof beneath the plate 131 in vertical alignment therewith.

In order to maintain positive coupling between the register assembly 129 and the shaft 40, the invention provides that the coupling gears 136, 138 and 139, as well as the assembly 129 and the shaft 40, be supported by the frame part 85. To this end a pair of supporting plates 142 are secured to the part 85 in spaced parallel relation as viewed in Fig. 3. The gears 138 and 139 are secured to suitable shafts 143 and 144, respectively, which are carried by the plates 142 for rotation relative to the plates 142. The gear 136 may be secured to the register assembly 129. By means of the invention, the frame part 85, together with the assembly 129, the rotor structure and the coupling gears 136, 138 and 139, may be removed as a unit from the remaining parts of the meter without disturbing the coupling between the assembly 129 and the shaft 40.

In order to damp rotation of the disc 39, one or more permanent damping magnets may be positioned to influence the disc 39. Preferably, a pair of permanent magnets 147 and 149 are provided for positioning at spaced areas of the disc 39. The details of construction of the magnets 147 and 149 are shown in Figs. 4, 5 and 6. As there shown, the magnets 147 and 149 are of identical construction each having a substantially U-shaped configuration. The magnet 147 is provided with a pair of opposed poles 151 and 152 having pole faces located in a common plane, and in a similar manner, the magnet 149 has a pair of opposed poles 153 and 154 having pole faces included in a common plane.

The magnets 147 and 149 may be constructed of any suitable magnetic material. Preferably, the magnets are constructed of a high coercive magnetic material, a number of which are commercially available. For example, high cobalt permanent magnet steel such as one containing 36% by weight of cobalt is available. Preferably, a high coercive material such as Alnico is employed in the construction of magnets. A number of high coercive materials are listed in a pamphlet entitled "Nickel Containing Alloys for Permanent Magnets" published in 1949 by the International Nickel Company, Inc., New York city. Such high coercive alloys have good resistance to demagnetization.

According to the invention, each of the frame parts 83 and 85 is proportioned to mount a separate one of the magnets 147 and 149. For this purpose each of the frame parts is formed with a suitable pocket having an open end proportioned to receive the magnets. As illustrated in Figs. 5 and 6, the frame part 85 is formed with a pocket 155 having an open end opening at the rear of the part 85. The frame part 83 is formed with a pocket 157 having an open end opening at the front of the part 83. It is observed that with the frame parts 83 and 85 in operative positions as shown in Fig. 4, the pockets 155 and 157 are positioned between the magnetic structures 41 and 58 with the open ends thereof opening toward each other.

In order to permit mounting of the magnets 147 and 149 to the frame parts 83 and 85, each of the magnets is positioned within a separate one of the pockets through the associated open end such that the magnets lie in a pair of spaced parallel planes extending transverse to the planes of the structures 41 and 58 when the frame parts 83 and 85 are in operative positions. The magnets are further positioned with the faces of the poles 151 and 153 lying substantially in a common plane which is parallel to the plane of the disc as viewed in Fig. 4. With such an arrangement, the magnets are located at diagrammatically opposed areas of the disc 39 with the poles 151, 152, 153 and 154 located on a common side of the disc.

The magnets 147 and 149 may be secured to the associated frame parts in any suitable manner. Preferably, the magnets are secured in the manner described in application Serial No. 437,030, filed June 16, 1954 by F. W. Witte, and assigned to the assignee of the present invention. According to such construction, the magnets 147 and 149 are proportioned for positioning within the pockets 155 and 157 with clearance between the peripheral surfaces of the magnets and the side walls of the pockets. Suitable securing means may then be positioned within the pockets between the peripheral surfaces of the magnets and the side walls of the pockets to secure the magnets to the associated frame parts within the pockets. According to the above referred to application, the securing means is in the form of a hardenable fluid material which is introduced into the pockets subsequent to positioning of the magnets therein.

In order to complete the magnetic circuits which include the magnets 147 and 149, a separate magnetic member is positioned beneath each of the magnets to provide paths for magnetic flux of the magnets. As illustrated in Figs. 5 and 6, magnetic bars 159 and 161 formed of any suitable magnetic material are associated respectively with the magnets 147 and 149 to define with the pole faces of the poles 151, 152, 153 and 154, air gaps 163 and 165. As viewed in Fig. 4, the air gaps 163 and 165 are positioned in horizontal alignment to permit rotation of the disc 39 therethrough. The magnetic bars 159 and 161 are conveniently carried by the frame parts 83 and 85, respectively. The magnetic bars may be secured to the associated frame parts in any suitable manner such as by a staking operation.

With the above-described construction, it is observed that the magnets 147 and 149 are effectively shielded against external magnetic fields by means of the frame parts 83 and 85 and the magnetic structures 41 and 58. It is observed with reference to Figs. 3 and 4 that the magnets 147 and 149 are positioned in an area which is surrounded by the opposed structures 41 and 58 and the opposed frame parts 83 and 85.

In order to control the influence of the elements 35 and 37 upon the disc 39, suitable adjustments are provided. For this purpose, suitable light load adjusting means may be associated with one or both of the elements 35 and 37 to control the response of the meter 1 to light load conditions of an associated circuit (not shown). As shown in Fig. 3, adjusting means 175 is associated only with the element 35 and includes an electroconductive loop 177 positioned beneath the voltage pole 45 of the structure 41 in the path of the voltage flux to intercept a portion of the voltage flux.

The loop 177 is mounted for adjustment relative to the pole 45 along an axis extending parallel to the plane of the structure 41 and to the plane of the pole face 47. For this purpose, a screw member 179 is supported for rotation about an axis extending parallel to the plane of the structure 41 by a bracket 181 which is secured to the structure 41. The screw member 179 is mounted in threaded engagement with a portion of the loop 177 without substantial axial movement so that rotation of the member 179 by actuation of an end portion 180 thereof effects axial movement of the loop 177 relative to the pole 45. A suitable spring member 185 is detachably secured to the bracket 181 by integral lugs 186 of the bracket to engage a portion of the loop 177 for mounting the loop 177 to the bracket 181 for movement relative to the structure 41. Further details of the construction of light load adjusting means may be found in application Serial No. 465,162, filed October 28, 1954 by F. V. Kadri, now Patent 2,833,048 and assigned to the assignee of the present invention.

In order to cause the elements 35 and 37 to apply substantially equal torques to the disc 39 for similar conditions of energization of the elements 35 and 37, suitable phase balance adjusting means is provided for adjusting the torque applied by one or both of the elements. As shown in Fig. 3, phase balance adjusting means 189 is associated with the structure 58 of the element 37 to control the torque applied by the element 37.

The adjusting means 189 includes a shunt magnetic path having an adjustable portion adjustable for diverting a variable portion of the voltage flux of the structure 58 away from the air gap 73 through the shunt path. To this end a magnetic block 191 is mounted adjacent the air gap 73 for movement relative to the voltage pole 61 along an axis extending parallel to the plane of the structure 58 and to the plane of the pole face 63. A magnetic projection 193 forming part of the shunt path may be secured to a side of the pole 61 to extend toward the block 191.

In order to mount the block 191 for adjustment, a non-magnetic screw member 194 is supported in threaded engagement with the block 191 by means of a magnetic bracket 195 which constitutes the main portion of the shunt path and which is secured to the structure 58. The member 194 is supported for rotation about an axis without substantial axial movement so that rotation of the member 194 by actuation of an end portion 197 thereof effects axial movement of the block 191 relative to the pole 61. Further details of the construction of phase balance adjusting means may be found in application Serial No. 517,595, filed June 23, 1955 by W. J. Schmidt, and assigned to the assignee of the present invention.

When the structures 41 and 58 are energized, it is desirable that the voltage and current fluxes of each of the structures 41 and 58 have a predetermined phase relationship. This relationship should be such that at unity power factor of an associated circuit (not shown) the voltage and current fluxes have a quadrature relationship. In order to establish such relationship, separate lag adjusting means is associated with each of the elements 35 and 37.

As shown in Fig. 3, adjusting means 196 and 198 are provided which include respectively electroconductive loops 199 and 201 each positioned to link magnetic flux of a separate one of the structures 41 and 58. The loops 199 and 201 are preferably positioned to surround respectively the current poles 49 and 51 of the structure 41 and the current poles 65 and 67 of the structure 58 to intercept voltage flux of the poles 45 and 61.

To permit adjustment of the adjusting means 196 and 198, the loops 199 and 201 are provided respectively with a plurality of spaced openings 203 and 205 which define weakened sections 207 and 209 of the loops 199 and 201. By severing the sections 207 and 209, the electrical resistance of the loops 199 and 201 may be varied to thereby adjust the lag effect thereof. Further details of the construction of flux lagging members may be found in application Serial No. 419,972, filed March 31, 1954, by A. J. Petzinger, and assigned to the assignee of the present invention.

Although the invention has been described with reference to certain specific embodiments thereof, numerous modifications are possible, and it is desired to cover all modifications falling within the spirit and scope of the invention.

I claim as my invention:

1. In an induction instrument, a stator structure including a pair of magnetic structures, each of said magnetic structures having an air gap, a rotor structure including an electroconductive disc, mounting means for mounting the stator and rotor structures in operative positions, said mounting means including a frame assembly having first and second frame parts, said first frame part being positioned between said magnetic structures to engage a separate side of each of said structures for mounting the structures in a pair of spaced parallel first planes with said air gaps in alignment in a second plane transverse to the first planes, said second frame part being secured to the magnetic structures substantially within the space therebetween to engage said separate sides of the magnetic structures at points spaced from the points at which said first frame part engages said separate sides to maintain the spacing between the magnetic structures, said second frame part mounting said disc for rotation through the aligned air gaps relative to the magnetic structures about a second axis extending transverse to said second plane, each of said frame parts having a pocket with an open end, said frame parts being positioned with said pockets between said magnetic structures with the open ends opening toward each other, and a separate permanent magnet positioned in each of said pockets, each of said frame parts being constructed of a non-magnetic, electroconductive material.

2. In a detachable type induction meter, a meter device, a cover receptacle for housing the meter device, said cover receptacle including a base plate supporting the meter device, a plurality of contact blades carried by said base plate, and a cover secured to the base plate to surround the meter device, said cover including a transparent end portion for permitting inspection of the meter device, said end portion and said base plate being respectively located at front and rear areas of the cover receptacle when the cover receptacle is in an operative position, a socket receptacle, including a plurality of contact jaws for detachably receiving said contact blades to support the cover receptacle in an operative position, said meter device including a stator structure having a pair of magnetic structures each including an air gap, a rotor structure including an electroconductive disc, a register assembly for providing an indication of the number of revolutions of the disc, coupling means for coupling said register assembly to said rotor structure to permit operation of said register assembly in accordance with rotation of said disc, and a permanent magnet for damping rotation of the disc; and a frame assembly positioned within the cover having first and sescond frame parts for supporting said meter device, said first frame part being secured to said base plate, said magnetic structures being secured to said first frame part in a pair of spaced parallel first planes with said air gaps in alignment in a second plane transverse to the first planes, said first frame part being positioned substantially within the space between said magnetic structures, each of said first planes including a line extending parallel to said second plane between said front and rear areas, said second frame part being secured to said magnetic structures substantially within the space therebetween at said front area in spaced relation relative to said first frame part to maintain the spacing between the magnetic structures, said second frame part mounting the disc for rotation about an axis extending transverse to said second plane relative to the magnetic structures through the aligned air gaps, said register assembly being secured to said second frame part at said front area adjacent said transparent end portion, said coupling means being carried by said second frame part to couple said rotor structure to said register assembly, said permanent magnet being supported by one of said frame parts within an area bounded by said magnetic structures and said frame parts.

References Cited in the file of this patent

UNITED STATES PATENTS

| | | |
|---|---|---|
| 606,795 | Stanley | July 5, 1898 |
| 817,843 | Gano | Apr. 17, 1906 |
| 1,082,653 | Scheefer | Dec. 30, 1913 |
| 1,609,687 | Brandt | Dec. 7, 1926 |
| 2,110,418 | Green | Mar. 8, 1938 |
| 2,134,575 | Pratt | Oct. 25, 1938 |
| 2,170,753 | Green | Aug. 22, 1939 |
| 2,243,130 | Sherwood | May 27, 1941 |

FOREIGN PATENTS

| | | |
|---|---|---|
| 19,081/34 | Australia | Mar. 28, 1935 |